US012755440B2

(12) United States Patent
Zou et al.

(10) Patent No.: US 12,755,440 B2
(45) Date of Patent: Oct. 6, 2026

(54) CODING METHOD, DECODING METHOD, AND DEVICE

(71) Applicant: VIVO MOBILE COMMUNICATION CO., LTD., Dongguan (CN)

(72) Inventors: Wenjie Zou, Dongguan (CN); Wei Zhang, Dongguan (CN); Fuzheng Yang, Dongguan (CN); Zhuoyi Lv, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 222 days.

(21) Appl. No.: 18/807,280

(22) Filed: Aug. 16, 2024

(65) Prior Publication Data

US 2024/0404119 A1 Dec. 5, 2024

Related U.S. Application Data

(63) Continuation of application No. PCT/CN2023/076113, filed on Feb. 15, 2023.

(30) Foreign Application Priority Data

Feb. 18, 2022 (CN) ......................... 202210153277.2

(51) Int. Cl.
*G06T 9/00* (2006.01)

(52) U.S. Cl.
CPC .................................... *G06T 9/001* (2013.01)

(58) Field of Classification Search
None
See application file for complete search history.

(56) References Cited

U.S. PATENT DOCUMENTS

2009/0184956 A1* 7/2009 Kim .......................... G06T 9/20 345/420
2014/0063024 A1* 3/2014 Zhang ..................... G06T 9/001 345/506

(Continued)

FOREIGN PATENT DOCUMENTS

| | | | |
|---|---|---|---|
| CN | 102510497 | A | 6/2012 |
| CN | 104243958 | A | 12/2014 |
| EP | 4481688 | A1 | 12/2024 |

OTHER PUBLICATIONS

Graziosi, Danillo et al., "[V-CG] Sony's Dynamic Mesh Coding Call for Proposal Response", International Organisation for Standardisation, Coding of Moving Pictures and Audio, Apr. 2022, ISO/IEC JTC 1/SC 29/WG 7 m59284.

(Continued)

*Primary Examiner* — Martin Mushambo
(74) *Attorney, Agent, or Firm* — The Webb Law Firm

(57) ABSTRACT

A coding method includes quantizing, by an encoder, geometric information of a target three-dimensional mesh, to obtain first information, where the first information includes first precision geometric information, second precision geometric information, or information about a supplementary point; and encoding, by the encoder, the first information, where the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

20 Claims, 6 Drawing Sheets

(56) References Cited

U.S. PATENT DOCUMENTS

| | | | | |
|---|---|---|---|---|
| 2020/0265611 | A1 | 8/2020 | Hemmer et al. | |
| 2021/0090301 | A1* | 3/2021 | Mammou | H04N 19/20 |
| 2022/0028119 | A1* | 1/2022 | Rhyu | G06T 9/001 |

OTHER PUBLICATIONS

Doumanoglou, Alexandros et al., "Benchmarking Open-Source Static 3D Mesh Codecs for Immersive Media Interactive Live Streaming", IEEE Journal on Emerging and Selected Topics in Circuits and Systems, Mar. 2019, vol. 9, No. 1.

* cited by examiner

CODING METHOD, DECODING METHOD, AND DEVICE

CROSS-REFERENCE TO RELATED APPLICATIONS

This application is a Bypass Continuation Application of International Patent Application No. PCT/CN2023/076113 filed Feb. 15, 2023, and claims priority to Chinese Patent Application No. 202210153277.2 filed Feb. 18, 2022, the disclosures of which are hereby incorporated by reference in their entireties.

BACKGROUND OF THE INVENTION

Field of the Invention

This application belongs to the field of coding and decoding technologies, and in particular, to a coding method, a decoding method, and a device.

Description of Related Art

Three-dimensional mesh modeling may be considered as the most popular method for expressing a three-dimensional model in the past many years, and plays an important role in many applications. As a convenient expression method, three-dimensional mesh modeling is widely integrated into graphics processing units (GPUs) of computers, tablet computers, and smartphones in the form of a hardware algorithm, and is specially used to render a three-dimensional mesh.

SUMMARY OF THE INVENTION

According to a first aspect, a coding method is provided, including:

- quantizing, by an encoder, geometric information of a target three-dimensional mesh, to obtain first information, where the first information includes at least one of the following: first precision geometric information, second precision geometric information, or information about a supplementary point; and
- encoding, by the encoder, the first information, where
- the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

According to a second aspect, a coding apparatus is provided, including:

- a first obtaining module, configured to quantize geometric information of a target three-dimensional mesh, to obtain first information, where the first information includes at least one of the following: first precision geometric information, second precision geometric information, or information about a supplementary point; and
- a coding module, configured to encode the first information, where
- the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

According to a third aspect, a decoding method is provided, including:

- decoding, by a decoder, an obtained bitstream, to obtain first information, where the first information includes at least one of the following: first precision geometric information, second precision geometric information, or information about a supplementary point; and
- performing, by the decoder, dequantization according to the first information, to obtain a target three-dimensional mesh, where
- the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

According to a fourth aspect, a decoding apparatus is provided, including:

- a second obtaining module, configured to decompose an obtained bitstream, to obtain first information, where the first information includes at least one of the following: first precision geometric information, second precision geometric information, or information about a supplementary point; and
- a third obtaining module, configured to perform dequantization according to the first information, to obtain a target three-dimensional mesh, where
- the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

According to a fifth aspect, a coding device is provided, where the coding device includes a processor and a memory, a program or instructions are stored in the memory and executable on the processor, and when the program or the instructions are executed by the processor, steps of the method according to the first aspect are implemented.

According to a sixth aspect, a coding device is provided, including a processor and a communication interface, where the processor is configured to quantize geometric information of a target three-dimensional mesh, to obtain first information, where the first information includes at least one of the following: first precision geometric information, second precision geometric information, or information about a supplementary point; and encode the first information, where

- the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

According to a seventh aspect, a decoding device is provided, where the decoding device includes a processor and a memory, a program or instructions are stored in the memory and executable on the processor, and when the program or the instructions are executed by the processor, steps of the method according to the third aspect are implemented.

According to an eighth aspect, a decoding device is provided, including a processor and a communication interface, where the processor is configured to decompose an obtained bitstream, to obtain first information, where the first information includes at least one of the following: first precision geometric information, second precision geometric information, or information about a supplementary point; and perform dequantization according to the first information, to obtain a target three-dimensional mesh, where the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

According to a ninth aspect, a communication system is provided, including a coding device and a decoding device, where the coding device may be configured to perform the steps of the method according to the first aspect, and the decoding device may be configured to perform the steps of the method according to the third aspect.

According to a tenth aspect, a non-transitory readable storage medium is provided, storing a program or instructions, where when the program or the instructions are executed by a processor, steps of the method according to the first aspect are implemented, or steps of the method according to the third aspect are implemented.

According to an eleventh aspect, a chip is provided, including a processor and a communication interface, where the communication interface is coupled to the processor, and the processor is configured to run a program or instructions, to implement the method according to the first aspect, or implement the method according to the third aspect.

According to a twelfth aspect, a computer program product is provided, being stored in a non-transitory storage medium, where the computer program product is executed by at least one processor, to implement the steps of the method according to the first aspect, or implement the method according to the third aspect.

According to a thirteenth aspect, a communication device is provided, configured to perform the steps of the method according to the first aspect, or implement the method according to the third aspect.

DESCRIPTION OF THE INVENTION

Figure 1:
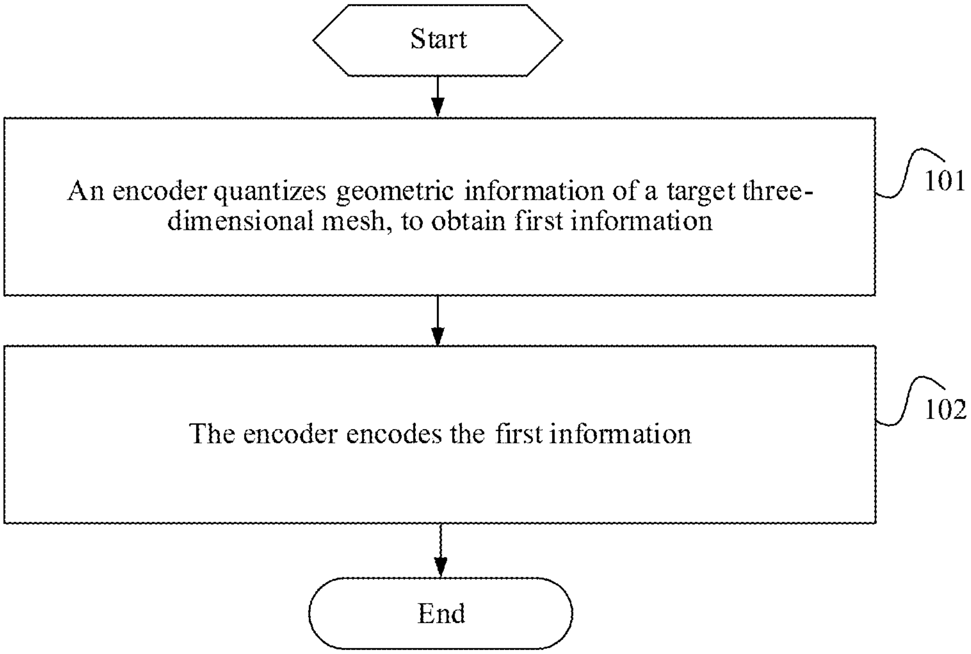
FIG. 1 is a schematic flowchart of a coding method according to an embodiment of this application.

The technical solutions in embodiments of this application are clearly described below with reference to the accompanying drawings in embodiments of this application. Apparently, the described embodiments are merely some rather than all of embodiments of this application. All other embodiments obtained by a person of ordinary skill in the art based on embodiments of this application shall fall within the protection scope of this application.

In the specification and claims of this application, terms “first” and “second” are used to distinguish similar objects, but are not used to describe an sequence or order. It may be understood that the terms used in such a way is interchangeable in proper circumstances, so that embodiments of this application can be implemented in other sequences than the sequence illustrated or described herein. In addition, objects distinguished by “first” and “second” are usually of Type, and the number of objects is not limited. For example, a first object may mean one or more first objects. In addition, in the specification and claims, “and/or” means at least one of the connected objects, and the character “/” generally indicates an “or” relation between associated objects.

It should be noted that, the technology described in embodiments of this application is not limited to a long term evolution (LTE)/LTE evolution (LTE-A) system, but may be further used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms “system” and “network” in embodiments of this application are often used interchangeably, and the described technologies may be used both for the systems and radio technologies mentioned above and may also be used for other systems and radio technologies. The following descriptions describe a new radio (NR) system for the objective of being used as an example, and NR terms are used in most of the descriptions below. However, these technologies may also be applied to applications other than NR system applications, such as a 6-th generation (6G) communication system.

Because vertices of the Mesh and a point cloud are respectively a set of randomly distributed discrete points in space, the vertices and the point clouds of the Mesh have similar characteristics. Therefore, geometric information of the three-dimensional mesh may be compressed by using a point cloud compression algorithm. However, compared with the point clouds, the vertices of the three-dimensional mesh are distributed more sparsely and unevenly in space. The use of the point cloud compression algorithm to compress the geometric information of the three-dimensional mesh model cannot achieve high compression efficiency.

The coding method and apparatus, the decoding method and apparatus, and the device provided in embodiments of this application are described in detail below by using some embodiments and application scenarios thereof with reference to the accompanying drawings.

As shown in FIG. 1, an embodiment of this application provides a coding method, including:

step 101: An encoder quantizes geometric information of a target three-dimensional mesh, to obtain first information.

It should be noted that, the target three-dimensional mesh described in this application may be understood as a three-dimensional mesh corresponding to any video frame. The geometric information of the target three-dimensional mesh may be understood as coordinates of vertices in the three-dimensional mesh, and the coordinates usually refer to three-dimensional coordinates.

The first information includes at least one of the following:

A11: First precision geometric information.

It should be noted that, the first precision geometric information may be understood as low precision geometric information. That is, the low precision geometric information refers to quantized geometric information of the target three-dimensional mesh, namely, three-dimensional coordinate information of each vertex included in the quantized target three-dimensional mesh.

A12: Second precision geometric information.

It should be noted that, the second precision geometric information may be understood as high precision geometric information, and the high precision geometric information may be considered as geometric information lost in a quantization process, namely, lost three-dimensional coordinate information.

A13: Information about a supplementary point.

It should be noted that, the information about the supplementary point refers to information about a point that is generated in a quantization process and that needs additional processing. In other words, the supplementary point is the point that is generated in the quantization process and that needs additional processing. For example, if there are duplicate points whose coordinate positions overlap with each other, and the like, by performing processing on the duplicate points, vertices whose coordinate positions overlap with each other during quantization may be restored to original positions after dequantization.

Optionally, the information about the supplementary point includes at least one of the following:

A131: An index of a vertex in the first precision geometric information corresponding to the supplementary point.

It should be noted that, by identifying the index, it may be learnt that which points in the quantized mesh identify a plurality of points in a three-dimensional mesh before quantization. That is, a plurality of points in the three-dimensional mesh before quantization overlap with each other after the three-dimensional mesh is quantized, and low precision geometric information of the supplementary point may be determined through the index of the vertex.

A132: Third precision geometric information of the supplementary point.

It should be noted that, the third precision geometric information may be understood as the low precision geometric information of the supplementary point, namely, quantized three-dimensional coordinate information of the supplementary point.

A133: Fourth precision geometric information of the supplementary point.

It should be noted that, the fourth precision geometric information may be understood as the high precision geometric information of the supplementary point, namely, three-dimensional coordinate information lost in the quantization process of the supplementary point.

It should be noted that, during use, hidden points after quantization that are obtained may be determined through A131 and A133 or A132 and A133.

Step 102: The encoder encodes the first information.

It should be noted that, after the first information is obtained, the first information may be encoded, to obtain a corresponding sub-bitstream. In the foregoing solution, the geometric information of the three-dimensional mesh is quantized, so that the spacings between vertices of the quantized three-dimensional mesh are reduced, to reduce spacings between two-dimensional vertices after projection, thereby improving compression efficiency of the geometric information of the three-dimensional mesh.

Optionally, an implementation of step 101 is:

quantizing, by the encoder, each vertex in the target three-dimensional mesh according to a quantization parameter of each component, to obtain the first precision geometric information.

It should be noted that, the quantization parameter of each component may be flexibly set according to a usage requirement; and the quantization parameter mainly includes quantization parameters on three components of X, Y, and Z.

Generally, for quantization that does not have a high requirement on precision, only the low precision geometric information may be retained after quantization. For quantization that has a high requirement on precision, not only the low precision geometric information needs to be recorded during quantization, but also the high precision geometric information needs to be recorded, so that precise mesh recovery may be implemented during decoding. In other words, an implementation of step 101 should further include:

obtaining, by the encoder, the second precision geometric information according to the first precision geometric information and the quantization parameter of each component.

For example, it is assumed that three-dimensional coordinates of a specific vertex are (x,y,z), quantization parameters are $(QP_x, QP_y, QP_z)$, and a calculation process of low precision geometric information $(x_l, y_l, z_l)$ and high precision geometric information $(x_h, y_h, z_h)$ is as shown in formula 1 to formula 6:

$$x_l = f_1(x, QP_x); \quad \text{Formula 1}$$

$$y_l = f_1(y, QP_y); \quad \text{formula 2}$$

$$z_l = f_1(z, QP_z); \quad \text{formula 3}$$

$$x_h = f_2(x, x_l, QP_x); \quad \text{formula 4}$$

$$y_h = f_2(y, y_l, QP_y); \text{ and} \quad \text{formula 5}$$

$$z_h = f_2(z, z_l, QP_z). \quad \text{formula 6}$$

The $f_1$ function in formula 1 to formula 3 is a quantization function. Inputs of the quantization function are coordinates of a specific dimension and quantization parameters of the dimension, and an output is a quantized coordinate value. Inputs of the $f_2$ function in formula 4 to formula 6 are an original coordinate value, a quantized coordinate value, and quantization parameters of the dimension, and an output is a high precision coordinate value.

The $f_1$ function may be calculated in many manners. A common calculation manner is as shown in formula 7 to formula 9, calculation is performed by dividing original coordinates of each dimension by quantization parameters of the dimension. / is a division operator. A result of a division operation may be rounded in different manners, such as rounding, rounding down, and rounding up. The $f_2$ function may also be calculated in a plurality of manners. Implementations corresponding to formula 7 to formula 9 are as shown in formula 10 to formula 12, where * is a multiplication operator.

$$x_l = x/QP_x; \quad \text{Formula 7}$$

$$y_l = y/QP_y; \quad \text{formula 8}$$

$$z_l = z/QP_z; \quad \text{formula 9}$$

$$x_h = x - x_l * QP_x; \quad \text{formula 10}$$

$$y_h = y - y_l * QP_y; \text{ and} \quad \text{formula 11}$$

$$z_h = z - z_l * QP_z. \quad \text{formula 12}$$

When a quantization parameter is an integer power of 2, the $f_1$ function and the $f_2$ function may be implemented by using bit operations, such as formula 13 to formula 18:

$$x_l = x \gg \log_2 QP_x; \quad \text{Formula 13}$$

$$y_l = y \gg \log_2 QP_y; \quad \text{formula 14}$$

$$z_l = z \gg \log_2 QP_z; \quad \text{formula 15}$$

$$x_h = x \,\&\, (QP_x - 1); \quad \text{formula 16}$$

$$y_h = y \,\&\, (QP_y - 1); \text{ and} \quad \text{formula 17}$$

$$z_h = z \,\&(QP_z - 1). \quad \text{formula 18}$$

It is worth noting that, regardless of the manners of calculating the $f_1$ function and the $f_2$ function, the quantization parameters $QP_x$, $QP_y$, and $QP_z$ may be flexibly set. First, quantization parameters of different components are not necessarily equal. Correlation of the quantization parameters of the different components may be used, to establish a relationship between $QP_x$, $QP_y$, and $QP_z$, and to set different quantization parameters for the different components. Second, quantization parameters in different spatial regions are not necessarily equal. The quantization parameters may be adaptively set according to sparsity of distribution of vertices in a local region.

It should be noted that, the high precision geometric information includes detailed information of an outline of the three-dimensional mesh. To improve the compression efficiency, the high precision geometric information ($x_h$, $y_h$, $z_h$) may be processed. In a three-dimensional mesh model, importance of high precision geometric information of vertices in different regions is different. For a region in which vertices are sparsely distributed, distortion of the high precision geometric information does not have a major impact on a visual effect of the three-dimensional mesh. In this case, to improve the compression efficiency, a case in which the high precision geometric information is quantized, or only high precision geometric information of some points is retained may be selected.

Optionally, in a quantization process, there may be a case in which a plurality of points completely coincide with each other at a same position after quantization. In other words, in this case, an implementation of step 101 should further include:

determining, by the encoder, the information about the supplementary point according to the geometric information of the target three-dimensional mesh and the first precision geometric information.

In other words, after obtaining low precision geometric information of all vertices, points with repeated low precision geometric information are used as supplementary points, and are separately encoded. Geometric information of the supplementary points may also be divided into two parts: low precision geometric information and high precision geometric information. According to a requirement of an application for compression distortion, a case in which all supplementary points are retained or only some supplementary points are retained may be selected. The high precision geometric information of the supplementary points may also be quantized, or only high precision geometric information of some points is retained.

It should be noted that, after quantizing the geometric information of the target three-dimensional mesh to obtain the first information, the first information needs to be encoded to obtain a final bitstream. Optionally, an implementation process of encoding the first information in this embodiment of this application includes:

step 1021: The encoder performs processing on the first information, to obtain second information, where the second information includes at least one of an occupancy map or a geometric map; and step 1022: The encoder encodes the second information.

It should be noted that, because types of information included in the first information are different, when processing is performed on the first information, different types of information are separately processed. An implementation process of step 1021 is described below respectively from perspectives of different information.

1. The first information includes the first precision geometric information.

Optionally, in this case, an implementation process of step 1021 includes:

step 10211: The encoder divides the first precision geometric information into three-dimensional patches.

It should be noted that, in this case, the low precision geometric information is mainly divided into patches, to obtain a plurality of three-dimensional patches. An implementation of this step is: The encoder determines a projection plane of each vertex included in the first precision geometric information; the encoder divides, according to the projection plane, the vertices included in the first precision geometric information into patches; and the encoder performs clustering on the vertices included in the first precision geometric information, to obtain each divided patch. In other words, a process of patch division mainly includes: first, estimating a normal vector of each vertex, and selecting a candidate projection plane with a smallest angle between a plane normal vector and a vertex normal vector as a projection plane of the vertex; then, performing initial division on the vertex according to the projection plane, and composing vertices whose projection planes are the same and are connected with each other into a patch; and finally, optimizing a clustering result by using a fine division algorithm, to obtain a final three-dimensional patch (3D patch).

An implementation of a process of obtaining the three-dimensional patch from the first precision geometric information is described in detail below.

First, a normal vector of each point is estimated. A tangent plane and a corresponding normal of the tangent plane are defined according to a nearest neighboring vertex m of each point at a predefined search distance. A K-D tree is used to separate data, and find adjacent points near a point $p_i$, and a center of gravity $c=\overline{p}$ of the set is used to define the normal. A method for calculating the center of gravity c is as follows:

$$c = \overline{p} = \frac{1}{m}\sum_{i=1}^{m} p_i. \quad \text{Formula 19}$$

An eigendecomposition method is used to estimate the vertex normal vector, where a calculation process is as shown in formula 20:

$$\sum_{i=1}^{m}(p_i - \overline{p})(p_i - \overline{p})^T. \quad \text{Formula 20}$$

In an initial division stage, a projection plane of each vertex is initially selected. An estimated value of the vertex normal vector is set to $\vec{n}_{p_i}$, and a normal vector of the candidate projection plane is $\vec{n}_{p_{idx}}$. A plane whose normal vector direction is closest to a vertex normal vector direction is selected as the projection plane of the vertex. A calculation process of plane selection is as shown in formula 21:

$$\max_{p_{idx}}\{\vec{n}_{p_i}\cdot\vec{n}_{p_{idx}}\}. \quad \text{Formula 21}$$

Figure 2:
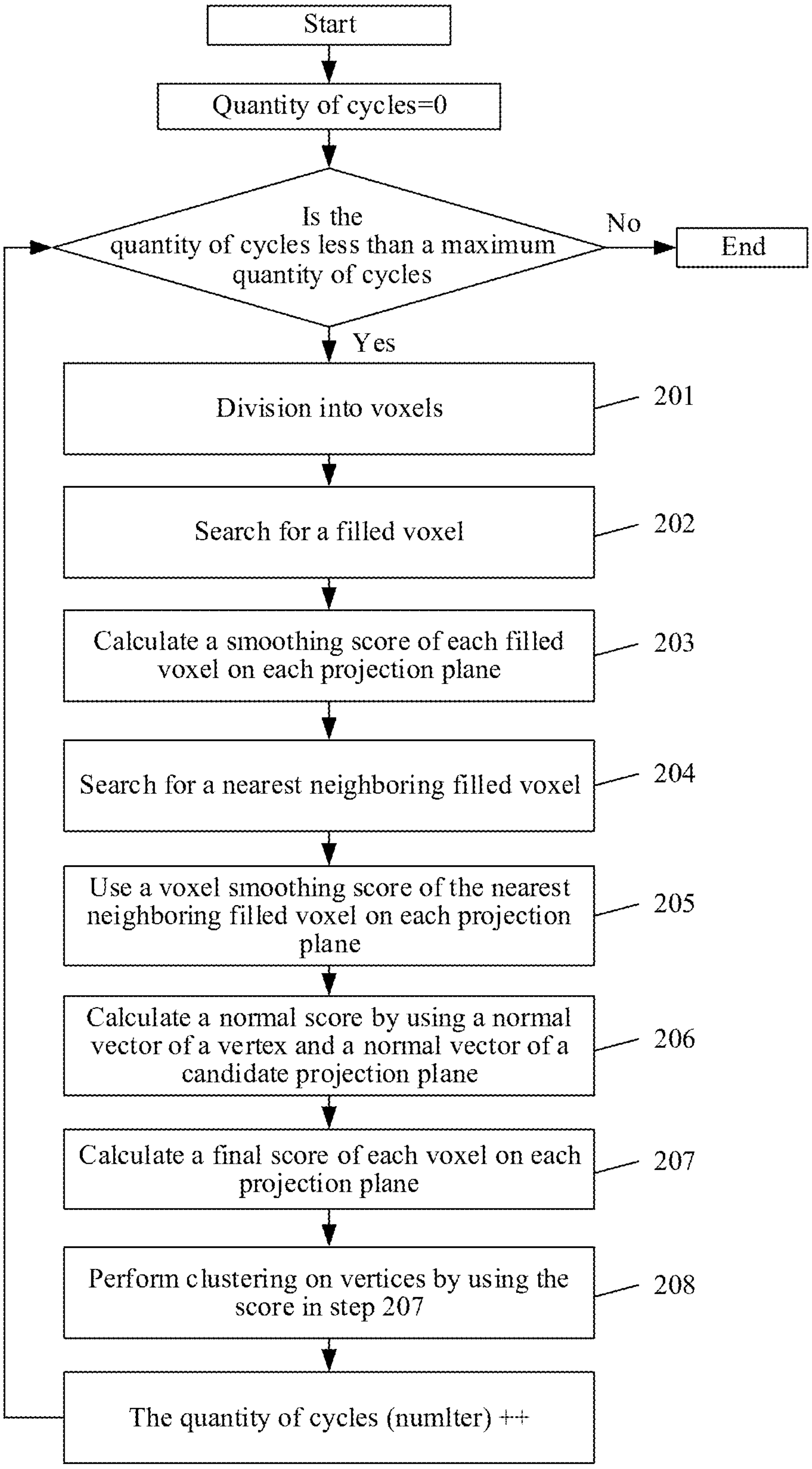
FIG. 2 is a schematic diagram of a fine division process based on a mesh.

In a fine division process, a mesh-based algorithm may be used to reduce time complexity of the algorithm. A flow of the mesh-based fine division algorithm is as shown in FIG. 2, which includes:

first, setting a quantity of cycles (number) to 0, determining whether the quantity of cycles is less than a maximum quantity of cycles (where it should be noted that, the maximum quantity of cycles may be set according to a usage requirement), and if the quantity of cycles is less than the maximum quantity of cycles, performing the following process:

Step S201: Divide an (x, y, z) geometric coordinate space into voxels.

It should be noted that, the geometric coordinate space refers to a geometric coordinate space including the first precision geometric information obtained by quantization. For example, for a 10-bit mesh using a voxel size of 8, a quantity of voxels at each coordinate is 1024/8=128, and a total quantity of voxels in the coordinate space is 128×128×128.

Step S202: Search for a filled voxel, where the filled voxel refers to a voxel that includes at least one point in a mesh.

Step S203: Calculate a smoothing score of each filled voxel on each projection plane, which is recorded as voxScoreSmooth, and a voxel smoothing score of the voxel on a projection plane is a quantity of points that converge to the projection plane through an initial segmentation process.

Step S204: Search for a nearest neighboring filled voxel in partitions by using a KD-Tree, which is recorded as nnFilledVoxels, namely, a nearest filled voxel for each filled voxel (within a search radius and/or limited to a maximum quantity of neighboring voxels).

Step S205: Use a voxel smoothing score of the nearest neighboring filled voxel on each projection plane, and calculate a smoothing score (scoreSmooth) of each filled voxel, where a calculation process is as shown in formula 22:

$$scoreSmooth[v][p] = \sum_{j=1}^{size(nnFilledVoxels[v])} voxScoreSmooth[v][p]. \quad \text{Formula 22}$$

p is an index of the projection plane, and v is an index of the nearest neighboring filled voxel. scoreSmooth of all points in one voxel is the same.

Step S206: Calculate a normal score by using a normal vector of a vertex and a normal vector of a candidate projection plane, which is recorded as scoreNormal, where a calculation process is as shown in formula 23:

$$scoreNormal[i][p] = \text{normal}[i]\cdot\text{orientation}[p]. \quad \text{Formula 23}$$

p is the index of the projection plane, and i is an index of the vertex.

Step S207: Use the scoreSmooth and the scoreNormal, and calculate a final score of each voxel on each projection plane, where a calculation process is as shown in formula 24:

$$\text{score}[i][p] = scoreNormal[i][p] + \frac{\lambda}{\text{size}(nnFilledVoxels[v])} \times scoreSmooth[v][p]. \quad \text{Formula 24}$$

i is the index of the vertex, p is the index of the projection plane, and v is an index of the voxel in which the vertex i is located.

Step S208: Perform clustering on vertices by using the score in step 207, to obtain finely divided patches.

The foregoing process is iterated a plurality of times, until an accurate patch is obtained.

Step 10212: The encoder performs two-dimensional projection on the three-dimensional patches, to obtain two-dimensional patches.

It should be noted that, in this process, the 3D patch is projected onto a two-dimensional plane to obtain the two-dimensional patch (2D patch).

Step 10213: The encoder packs the two-dimensional patches, to obtain two-dimensional image information.

It should be noted that, this step implements patch packing. An objective of patch packing is to arrange 2D patches on a two-dimensional image. A basic principle of patch packing is to arrange the patches on the two-dimensional image without overlapping or to arrange non-pixel parts of the patches on the two-dimensional image with partial overlapping. Through algorithms such as priority arrangement and time domain consistent arrangement, the patches are arranged more closely, and have time domain consistency, thereby improving coding performance.

It is assumed that a resolution of the two-dimensional image is W×H, and it is defined that a size of a minimum block in the patch arrangement is T, which specifies a minimum distance between different patches placed on the 2D mesh.

First, the patches are inserted and placed on the 2D mesh according to a non-overlapping principle. Each patch occupies a region including an integer number of T×T blocks. In addition, it is required that there is a distance of at least one T×T block between adjacent patches. When there is not enough space to place a next patch, a height of an image is doubled, and the patch continues to be placed.

Figure 3:
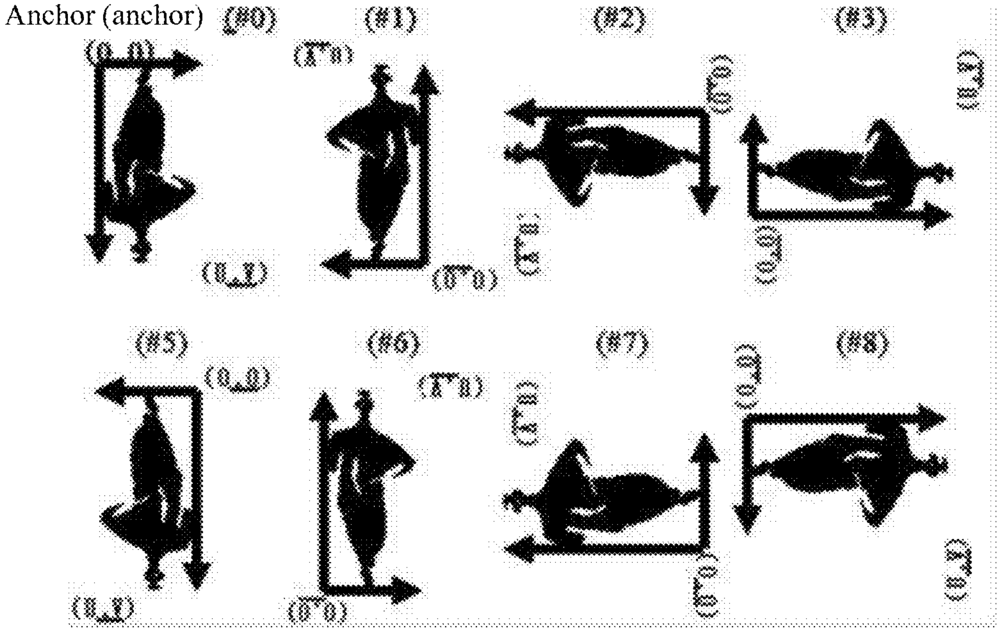
FIG. 3 is a schematic diagram of eight directions of patch arrangement.

To arrange the patches more closely, the patches may be arranged in a plurality of different directions. For example, eight different arrangement directions may be used, as shown in FIG. 3, including 0 degree, 180 degrees, 90 degrees, 270 degrees, and mirror images of the first four directions.

To adapt to characteristics of inter-frame prediction of a video encoder, a patch arrangement method with time domain consistency is used. In one group of frame (GOF), all patches of a first frame are arranged in descending order. For other frames in the GOF, the time domain consistency algorithm is used to adjust an arrangement order of the patches.

It should be noted that, after obtaining two-dimensional image information, patch information may be obtained according to information in the process of obtaining the two-dimensional image information. Then, the patch information may be encoded, to obtain a patch information sub-bitstream.

It should be noted that, in the process of obtaining the two-dimensional image information, patch division information, patch projection plane information, and patch packing position information need to be recorded. Therefore, the patch information records information about each step operation in the process of obtaining the two-dimensional image, that is, the patch information includes: the patch division information, the patch projection plane information, and the patch packing position information.

Step 10214: The encoder obtains a first precision occupancy map and a first precision geometric map according to the two-dimensional image information.

It should be noted that, a process of obtaining the occupancy map is mainly: by using the patch arrangement information obtained by patch packing, setting a position of the vertex in the two-dimensional image to 1, and setting remaining positions to 0, to obtain the occupancy map. The process of obtaining the geometric map is mainly: in the process of obtaining the 2D patch through projection, a distance from each vertex to the projection plane is saved. The distance is referred to as a depth. A compression part of a low precision geometric map is to arrange a depth value of each vertex in the 2D patch to a position of the vertex in the occupancy map, to obtain the low precision geometric map.

2. The first information includes the second precision geometric information.

Optionally, in this case, an implementation process of step 1021 includes:

step 10215: The encoder obtains an arrangement order of vertices included in the first precision geometric information; and step 10216: The encoder arranges second precision geometric information corresponding to the vertices included in the first precision geometric information in a two-dimensional image, to generate a second precision geometric map.

Figure 4:
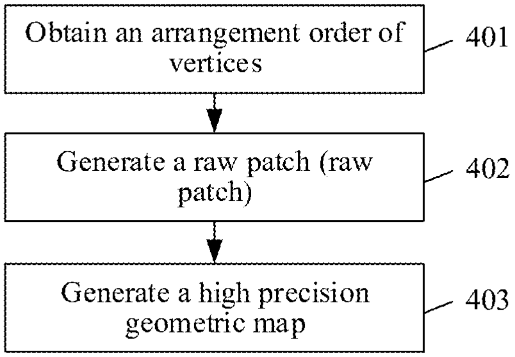
FIG. 4 is a schematic diagram of a coding process of high precision geometric information.

It should be noted that, the high precision geometric information is arranged in a manner of a raw patch. High precision geometric information corresponding to the vertices in the low precision geometric map is arranged in the two-dimensional image, to obtain the raw patch, thereby generating a high precision geometric map. There are mainly three steps, as shown in FIG. 4, including:

step 401: Obtain an arrangement order of vertices, scan a low precision geometric map row by row from left to right, and use a scanning order of each vertex as an arrangement order of vertices in a raw patch.

Step 402: Generate the raw patch.

Figure 5:
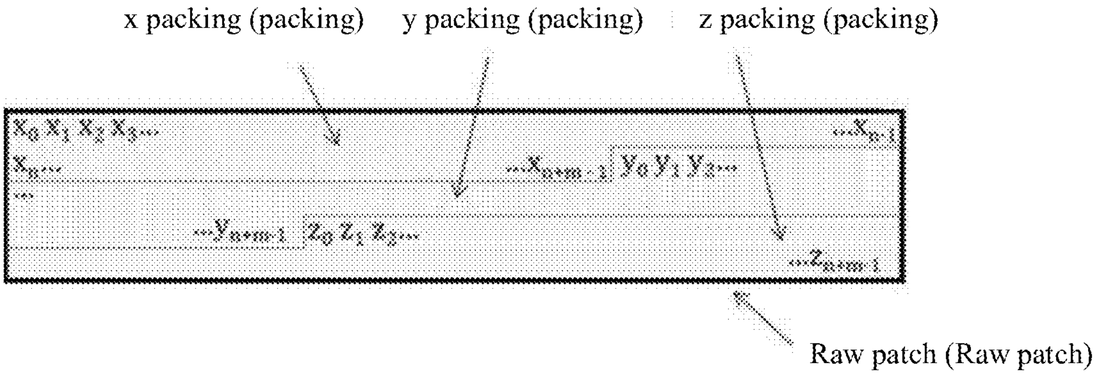
FIG. 5 is a schematic diagram of a raw patch.

It should be noted that, the raw patch is a rectangular patch formed by arranging three-dimensional coordinates of the vertices row by row in a manner as shown in FIG. 5. According to the arrangement order of the vertices obtained in the first step, high precision geometric information of the vertices is arranged in order, to obtain a raw patch of the high precision geometric information.

Step 403: Place the high precision geometric information in a two-dimensional image, to generate a high precision geometric map.

It should be noted that, when obtaining a geometric map sub-bitstream by encoding, the encoder encodes a first precision geometric map and a second precision geometric map, to obtain the geometric map sub-bitstream.

3. The first information includes the information about the supplementary point.

Optionally, in this case, an implementation process of step 1021 includes:

step 10217: The encoder arranges third precision geometric information of the supplementary point into a first raw patch;

step 10218: The encoder arranges fourth precision geometric information of the supplementary point into a second raw patch in a same arrangement order as the first raw patch; and step 10219: The encoder compresses the first raw patch and the second raw patch, to obtain a geometric map of the supplementary point.

It should be noted that, in this embodiment of this application, a low precision part and a high precision part of geometric information of the supplementary point are separately encoded. First, the low precision geometric information of the supplementary point is arranged into a low precision raw patch of the supplementary point in any order; then, the high precision geometric information is arranged into a high precision raw patch of the supplementary point in the same order as the low precision raw patch of the supplementary point; and finally, to compress the low precision raw patch of the supplementary point and the high precision raw patch of the supplementary point, a plurality of compression methods may be used. One method is to encode values in the raw patch in manners such as run-length coding and entropy coding. Another method is to add the low precision raw patch of the supplementary point to a blank region in the low precision geometric map, and add the high precision raw patch of the supplementary point to a blank region of the high precision geometric map, to obtain the geometric map of the supplementary point.

Figure 6:
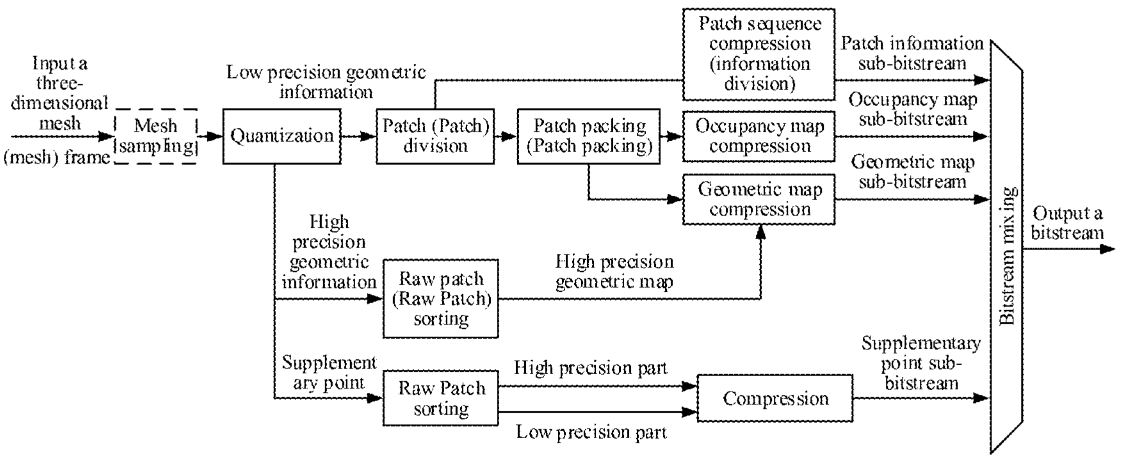
FIG. 6 is a schematic diagram of a coding framework of geometric information of a video-based three-dimensional mesh.

A coding framework of geometric information of a video-based three-dimensional mesh in this embodiment of this application is as shown in FIG. 6. An overall coding process is:

First, whether to sample and simplify the three-dimensional mesh may be selected before quantization. Then, the three-dimensional mesh is quantized, and therefore, three parts: the low precision geometric information, the high precision geometric information, and the information about the supplementary point may be generated. Patch division is performed on the low precision geometric information in a manner of projection, patch sequence compression information (patch division information), the occupancy map, and the low precision geometric map are generated through patch arrangement. The possible high precision geometric information may be arranged in a manner of the raw patch, to generate the high precision geometric map (where it should be noted that, the high precision geometric map may be separately encoded into a bitstream, or the high precision geometric map may also be filled into the low precision geometric map, and the low precision geometric map is encoded to obtain a bitstream). For the possible supplementary point, the geometric information of the supplementary point may be divided into a low precision part and a high precision part, which are separately arranged in the manner of the raw patch, and are separately encoded into a bitstream, or the raw patch is added to the geometric map. Finally, the patch sequence compression information, the occupancy map, and the geometric map are encoded to separately obtain corresponding sub-bitstreams, and a plurality of sub-bitstreams are mixed, to obtain a finally output bitstream.

It should be noted that, this application provides an implementation of encoding the geometric information of the three-dimensional mesh. The geometric information of the three-dimensional mesh is quantized, and the quantized information of different precisions is separately encoded, so that the compression efficiency of the geometric information of the three-dimensional mesh may be improved.

In the coding method provided in embodiments of this application, an execution entity may be a coding apparatus. In embodiments of this application, that the coding apparatus performs the coding method is used as an example, to describe the coding apparatus provided in embodiments of this application.

Figure 7:
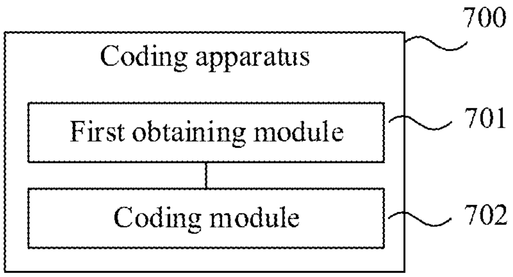
FIG. 7 is a schematic diagram of a module of a coding apparatus according to an embodiment of this application.

As shown in FIG. 7, an embodiment of this application provides a coding apparatus 700, including:

a first obtaining module 701, configured to quantize geometric information of a target three-dimensional mesh, to obtain first information, where the first information includes at least one of the following: first precision geometric information, second precision geometric information, or information about a supplementary point; and a coding module 702, configured to encode the first information, where the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

Optionally, the first obtaining module 701 is configured to:

quantize each vertex in the target three-dimensional mesh according to a quantization parameter of each component, to obtain the first precision geometric information.

Optionally, the first obtaining module 701 is further configured to:

obtain the second precision geometric information according to the first precision geometric information and the quantization parameter of each component.

Optionally, the first obtaining module 701 is further configured to:

determine the information about the supplementary point according to the geometric information of the target three-dimensional mesh and the first precision geometric information.

Optionally, the information about the supplementary point includes at least one of the following:

an index of a vertex in the first precision geometric information corresponding to the supplementary point;

third precision geometric information of the supplementary point, where the third precision geometric information is quantized three-dimensional coordinate information of the supplementary point; or fourth precision geometric information of the supplementary point, where the fourth precision geometric information is three-dimensional coordinate information lost in the quantization process of the supplementary point.

Optionally, the coding module 702 includes:

a first obtaining unit, configured to perform processing on the first information, to obtain second information, where the second information includes at least one of an occupancy map or a geometric map; and a coding unit, configured to encode the second information.

Optionally, when the first information includes the first precision geometric information, the first obtaining unit is configured to:

divide the first precision geometric information into three-dimensional patches;

perform two-dimensional projection on the three-dimensional patches, to obtain two-dimensional patches;

pack the two-dimensional patches, to obtain two-dimensional image information; and obtain a first precision occupancy map and a first precision geometric map according to the two-dimensional image information.

Optionally, after packing the two-dimensional patches, to obtain two-dimensional image information, the first obtaining unit is further configured to:

obtain patch information according to information in the process of obtaining the two-dimensional image information; and encode the patch information, to obtain a patch information sub-bitstream.

Optionally, when the first information includes the second precision geometric information, the first obtaining unit is configured to:

obtain an arrangement order of vertices included in the first precision geometric information; and arrange second precision geometric information corresponding to the vertices included in the first precision geometric information in a two-dimensional image, to generate a second precision geometric map.

Optionally, the coding unit is configured to:

encode a first precision geometric map and a second precision geometric map, to obtain a geometric map sub-bitstream.

Optionally, when the first information includes the information about the supplementary point, the first obtaining unit is configured to:

arrange third precision geometric information of the supplementary point into a first raw patch;

arrange fourth precision geometric information of the supplementary point into a second raw patch in a same arrangement order as the first raw patch; and compress the first raw patch and the second raw patch, to obtain a geometric map of the supplementary point.

This apparatus embodiment corresponds to the coding method embodiment. Each implementation process and implementation of the method embodiment may be applied to the apparatus embodiment, and may achieve the same technical effect.

Figure 8:
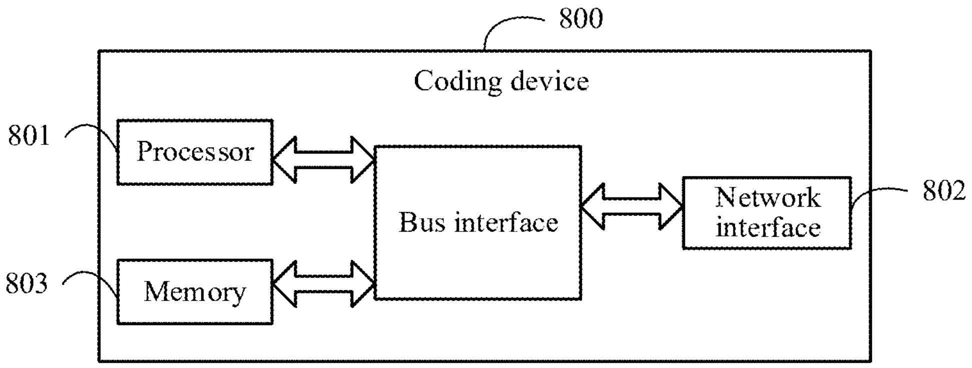
FIG. 8 is a schematic diagram of a structure of a coding device according to an embodiment of this application.

Optionally, an embodiment of this application further provides a coding device. As shown in FIG. 8, the coding device 800 includes: a processor 801, a network interface 802, and a memory 803. The network interface 802 is, for example, a common public radio interface (CPRI).

Optionally, the coding device 800 in this embodiment of this application further includes: instructions or a program stored in the memory 803 and executable on the processor 801. The processor 801 invokes the instructions or the program in the memory 803 to perform the method performed by each module shown in FIG. 7, and implements the same technical effect. To avoid repetition, details are not described herein again.

Figure 9:
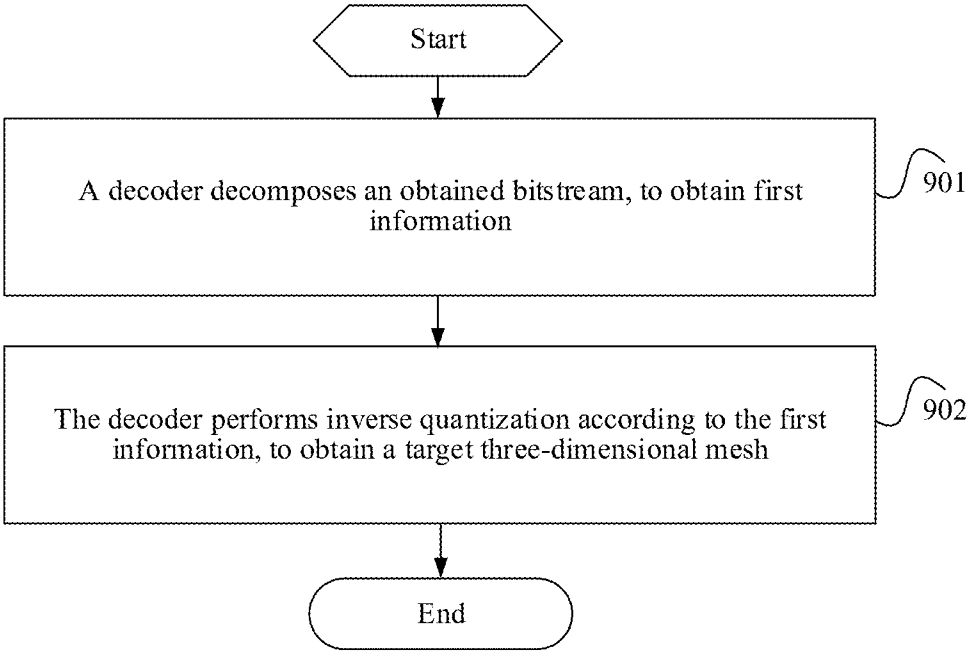
FIG. 9 is a schematic flowchart of a decoding method according to an embodiment of this application.

As shown in FIG. 9, an embodiment of this application further provides a decoding method, including:

step 901: A decoder decomposes an obtained bitstream, to obtain first information, where it should be noted that, the first information includes at least one of the following: first precision geometric information, second precision geometric information, or information about a supplementary point; and step 902: The decoder performs dequantization according to the first information, to obtain a target three-dimensional mesh, where the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

Optionally, an implementation of step 901 includes:

obtaining, by the decoder, a target sub-bitstream according to the obtained bitstream, where the target sub-bitstream includes: a patch information sub-bitstream, an occupancy map sub-bitstream, and a geometric map sub-bitstream;

obtaining, by the decoder, second information according to the target sub-bitstream, where the second information includes: at least one of an occupancy map or a geometric map; and obtaining, by the decoder, the first information according to the second information.

Optionally, in a case that the first information includes the first precision geometric information, the obtaining the first information according to the second information includes:

obtaining, by the decoder, two-dimensional image information according to a first precision occupancy map and a first precision geometric map;

obtaining, by the decoder, a two-dimensional patch according to the two-dimensional image information;

performing, by the decoder, three-dimensional back-projection on the two-dimensional patch according to patch information corresponding to the patch information sub-bitstream, to obtain a three-dimensional patch; and obtaining, by the decoder, the first precision geometric information according to the three-dimensional patch.

Optionally, in a case that the first information includes the second precision geometric information, the obtaining the first information according to the second information includes:

obtaining, by the decoder, the second precision geometric information according to a second precision geometric map.

Optionally, in a case that the first information includes the information about the supplementary point, the obtaining the first information according to the second information includes:

determining, by the decoder according to a geometric map of the supplementary point, a first raw patch corresponding to third precision geometric information of the supplementary point and a second raw patch corresponding to fourth precision geometric information of the supplementary point; and determining, by the decoder, the information about the supplementary point according to the first raw patch and the second raw patch.

It should be noted that, in this embodiment of this application, a low precision part and a high precision part of geometric information of the supplementary point are separately decoded. First, the geometric map of the supplementary point is decompressed. A plurality of decompression methods may be used. One method is to decode the geometric map in manners such as run-length decoding and entropy decoding. Another method is to extract the low precision raw patch of the supplementary point from the low precision geometric map, and extract the high precision raw patch of the supplementary point from the high precision geometric map. Then, the low precision geometric information of the supplementary point is obtained from the low precision raw patch of the supplementary point in a specific order, and the high precision geometric information is obtained from the high precision raw patch of the supplementary point in a specific order. It should be noted that, the specific order is obtained by the decoder by parsing the bitstream. That is, the encoder notifies the decoder through the bitstream that the low precision raw patch of the supplementary point and the high precision raw patch of the supplementary point are generated in which order.

Optionally, the performing dequantization according to the first information, to obtain a target three-dimensional mesh includes:

determining, by the decoder, coordinates of each vertex in the first precision geometric information according to the first precision geometric information and a quantization parameter of each component. Optionally, the performing dequantization according to the first information, to obtain a target three-dimensional mesh further includes:

determining, by the decoder, the target three-dimensional mesh according to coordinates of each vertex in the target three-dimensional mesh and the second precision geometric information.

Figure 10:
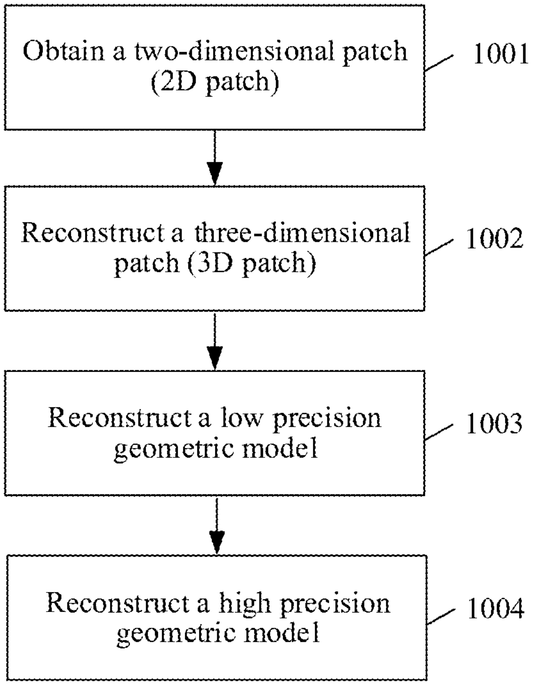
FIG. 10 is a block diagram of reconstruction of geometric information.

It should be noted that, a reconstruction process of the geometric information in this embodiment of this application is a process of reconstructing a three-dimensional geometric model by using information such as the patch information, the occupancy map, the low precision geometric map, and the high precision geometric map. A process is as shown in FIG. 10, which mainly includes the following four steps.

Step 1001: Obtain a 2D patch.

It should be noted that, the obtaining a 2D patch refers to segmenting placeholder information and depth information of the 2D patch from the occupancy map and the geometric map by using the patch information. The patch information includes a position and a size of a bounding box of each 2D patch in the occupancy map and the low precision geometric map. The placeholder information and the low precision geometric information of the 2D patch may be directly obtained by using the patch information, the occupancy map, and the low precision geometric map. For the high precision geometric information, a vertex scanning order of the low precision geometric map is used, to enable the high precision geometric information in the high precision raw patch to correspond to vertices of the low precision geometric map, thereby obtaining the high precision geometric information of the 2D patch. For the geometric information of the supplementary point, the low precision geometric information and the high precision geometric information of the supplementary point may be obtained by directly decoding the low precision raw patch and the high precision raw patch of the supplementary point.

Step 1002: Reconstruct a 3D patch.

It should be noted that, the reconstructing a 3D patch refers to reconstructing the vertices in the 2D patch into a low precision 3D patch by using the placeholder information and the low precision geometric information of the 2D patch. The placeholder information of the 2D patch includes a position of a vertex relative to a coordinate origin in a local coordinate system of a projection plane of a patch, and the depth information includes a depth value of a vertex in a normal direction of the projection plane. Therefore, the 2D patch may be reconstructed into the low precision 3D patch in the local coordinate system by using the placeholder information and the depth information.

Step 1003: Reconstruct a low precision geometric model.

It should be noted that, the reconstructing a low precision geometric model refers to reconstructing the entire low precision three-dimensional geometric model by using the reconstructed low precision 3D patch. The patch information includes a conversion relationship of the 3D patch converted from a 3D patch in the local coordinate system to a 3D patch in a global coordinate system of the three-dimensional geometric model. All 3D patches are converted to 3D patches in the global coordinate system by using a coordinate conversion relationship, and the low precision three-dimensional geometric model is obtained. In addition, for the supplementary point, the geometric information in the low precision raw patch is directly used, to obtain a low precision coordinate value of the supplementary point in the global coordinate system, thereby obtaining the complete low precision three-dimensional geometric model.

Step 1004: Reconstruct a high precision geometric model.

The reconstructing a high precision geometric model refers to a process of reconstructing, based on the low precision geometric model, the high precision geometric model by using the high precision geometric information. In the process of obtaining the 2D patch, the high precision geometric information corresponds to the low precision geometric information, and high precision three-dimensional coordinates of the vertex may be reconstructed according to the high precision geometric information and the low precision geometric information of the vertex. According to a requirement of an application, a case in which high precision three-dimensional coordinates of all vertices are reconstructed, or high precision three-dimensional coordinates of some vertices are reconstructed may be selected. A calculation process of high precision three-dimensional coordinates $(x_r, y_r, z_r)$ is as shown in formula 25 to formula 27:

$$x_r = f_3(x_l, x_h, QP_x); \quad \text{formula 25}$$

$$y_r = f_3(y_l, y_h, QP_y); \text{ and} \quad \text{formula 26}$$

$$z_r = f_3(z_l, z_h, QP_z). \quad \text{formula 27}$$

The $f_3$ function is a reconstruction function. A calculation process of the reconstruction function corresponds to a calculation process of a quantization function at the encoder, and there are many implementations. If the $f_1$ function uses implementations in formula 7 to formula 12, implementations of the reconstruction function are as shown in formula 28 to formula 30:

$$x_r = x_l * QP_x + x_h; \quad \text{Formula 28}$$

$$y_r = y_l * QP_y + y_h; \text{ and} \quad \text{formula 29}$$

$$z_r = z_l * QP_z + z_h. \quad \text{formula 30}$$

If the $f_1$ function uses implementations in formula 13 to formula 18, implementations of the reconstruction function are as shown in formula 31 to formula 33:

$$x_r = (x_l \ll \log_2 QP_x) \,|\, x_h; \quad \text{Formula 31}$$

$$y_r = (y_l \ll \log_2 QP_y) \,|\, y_h; \text{ and} \quad \text{formula 32}$$

$$z_r = (z_l \ll \log_2 QP_Z) \,|\, z_h. \quad \text{formula 33}$$

Optionally, the performing dequantization according to the first information, to obtain a target three-dimensional mesh further includes:

determining, by the decoder, the target three-dimensional mesh according to the information about the supplementary point and the coordinates of each vertex in the first precision geometric information.

Optionally, the information about the supplementary point includes at least one of the following:

an index of a vertex in the first precision geometric information corresponding to the supplementary point;

third precision geometric information of the supplementary point, where the third precision geometric information is quantized three-dimensional coordinate information of the supplementary point; or fourth precision geometric information of the supplementary point, where the fourth precision geometric information is three-dimensional coordinate information lost in the quantization process of the supplementary point.

Figure 11:
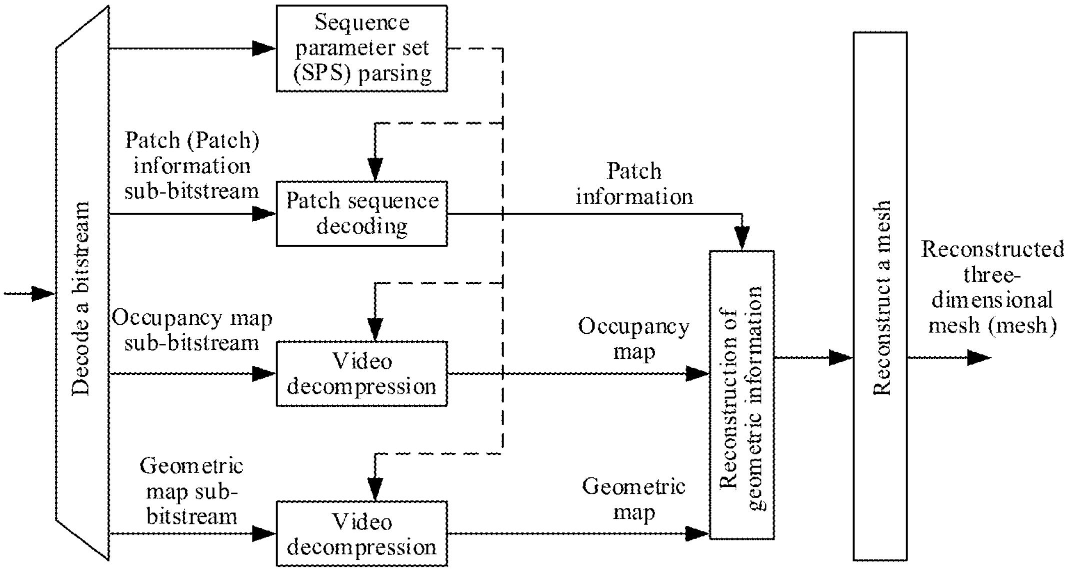
FIG. 11 is a schematic diagram of a decoding framework of geometric information of a video-based three-dimensional mesh.

A decoding framework of geometric information of a video-based three-dimensional mesh in this embodiment of this application is as shown in FIG. 11. An overall decoding process is:

First, a bitstream is decomposed into a patch information sub-bitstream, an occupancy map sub-bitstream, and a geometric map sub-bitstream (where it should be noted that, the geometric map sub-bitstream may include a bitstream corresponding to the low precision geometric map and a bitstream corresponding to the high precision geometric map, or the geometric map sub-bitstream includes a bitstream corresponding to a low precision geometric map filled with the high precision geometric map), which are separately decoded to obtain patch information, an occupancy map, and a geometric map. The geometric information of the low precision mesh may be reconstructed by using the occupancy map and the low precision geometric map, and the geometric information of the high precision mesh may be reconstructed by using the occupancy map, the low precision geometric map, and the high precision geometric map. Finally, the mesh is reconstructed by using the reconstructed geometric information and a connection relationship obtained in other coding and decoding manners.

It should be noted that, this embodiment of this application is a counterpart method embodiment corresponding to the foregoing coding method embodiment, and a decoding process is a reverse process of coding. All the foregoing implementations on the encoder are applicable to the embodiment of the decoder, and may also achieve the same technical effect. This is not described herein again.

Figure 12:
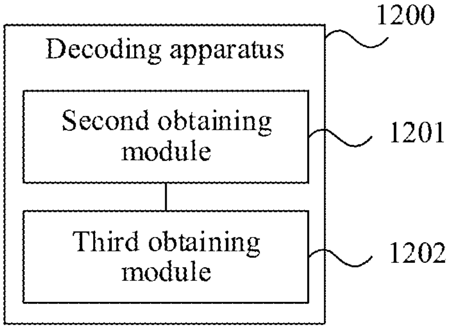
FIG. 12 is a schematic diagram of a module of a decoding apparatus according to an embodiment of this application.

As shown in FIG. 12, an embodiment of this application further provides a decoding apparatus 1200, including:

- a second obtaining module 1201, configured to decompose an obtained bitstream, to obtain first information, where the first information includes at least one of the following: first precision geometric information, second precision geometric information, or information about a supplementary point; and
- a third obtaining module 1202, configured to perform dequantization according to the first information, to obtain a target three-dimensional mesh, where
- the first precision geometric information is quantized geometric information of the target three-dimensional mesh, the second precision geometric information is geometric information lost in the quantization process of the target three-dimensional mesh, and the information about the supplementary point is information about a point that is generated in the quantization process and that needs additional processing.

Optionally, the second obtaining module 1201 includes:

- a second obtaining unit, configured to obtain a target sub-bitstream according to the obtained bitstream, where the target sub-bitstream includes: a patch information sub-bitstream, an occupancy map sub-bitstream, and a geometric map sub-bitstream;
- a third obtaining unit, configured to obtain second information according to the target sub-bitstream, where the second information includes: at least one of an occupancy map or a geometric map; and
- a fourth obtaining unit, configured to obtain the first information according to the second information.

Optionally, when the first information includes the first precision geometric information, the fourth obtaining unit is configured to:

- obtain two-dimensional image information according to a first precision occupancy map and a first precision geometric map;
- obtain a two-dimensional patch according to the two-dimensional image information;
- perform three-dimensional back-projection on the two-dimensional patch according to patch information corresponding to the patch information sub-bitstream, to obtain a three-dimensional patch; and
- obtain the first precision geometric information according to the three-dimensional patch.

Optionally, when the first information includes the second precision geometric information, the fourth obtaining unit is configured to:

- obtain the second precision geometric information according to a second precision geometric map.

Optionally, when the first information includes the information about the supplementary point, the fourth obtaining unit is configured to:

- determine, according to a geometric map of the supplementary point, a first raw patch corresponding to third precision geometric information of the supplementary point and a second raw patch corresponding to fourth precision geometric information of the supplementary point; and
- determine the information about the supplementary point according to the first raw patch and the second raw patch.

Optionally, the third obtaining module 1202 is configured to:

- determine coordinates of each vertex in the first precision geometric information according to the first precision geometric information and a quantization parameter of each component.

Optionally, the third obtaining module 1202 is further configured to:

- determine the target three-dimensional mesh according to coordinates of each vertex in the target three-dimensional mesh and the second precision geometric information.

Optionally, the third obtaining module 1202 is configured to:

- determine the target three-dimensional mesh according to the information about the supplementary point and the coordinates of each vertex in the first precision geometric information.

Optionally, the information about the supplementary point includes at least one of the following:

- an index of a vertex in the first precision geometric information corresponding to the supplementary point;
- third precision geometric information of the supplementary point, where the third precision geometric information is quantized three-dimensional coordinate information of the supplementary point; or
- fourth precision geometric information of the supplementary point, where the fourth precision geometric information is three-dimensional coordinate information lost in the quantization process of the supplementary point.

It should be noted that, the apparatus embodiment is an apparatus corresponding to the foregoing method. All implementations in the foregoing method embodiment are applicable to the apparatus embodiment, and may also achieve the same technical effect. This is not described again herein.

Optionally, an embodiment of this application further provides a decoding device, including a processor, a memory, and a program or instructions stored in the memory and executable on the processor, where when the program or the instructions are executed by the processor, various processes of the decoding method embodiment are implemented, and the same technical effect may be achieved. To avoid repetition, details are not described herein again.

An embodiment of this application further provides a non-transitory readable storage medium, storing therein a program or instructions, where when the program or the instructions are executed by a processor, various processes of the decoding method embodiment are implemented, and the same technical effect may be achieved. To avoid repetition, details are not described herein again.

The non-transitory computer-readable storage medium may include a read-only memory (ROM), a random access memory (RAM), a magnetic disk, or an optical disc.

An embodiment of this application further provides a decoding device, including a processor and a communication interface, where the communication interface is configured to decompose an obtained bitstream, to obtain first information, where the first information includes at least one of the following: first precision geometric information, second precision geometric information, or information about a supplementary point; and perform dequantization according to the first information, to obtain a target three-dimensional mesh.

The decoding device embodiment corresponds to the decoding method embodiment. Each implementation process and implementation of the method embodiment may be applied to the decoding device embodiment, and may achieve the same technical effect.

Optionally, an embodiment of this application further provides a decoding device. A structure of the decoding device is as shown in FIG. 8. This is not described herein again. The decoding device in this embodiment of this application further includes: instructions or a program stored in the memory and executable on the processor. The processor invokes the instructions or the program in the memory, to perform the method performed by each module shown in FIG. 10, and achieves the same technical effect. To avoid repetition, details are not described herein again.

An embodiment of this application further provides a non-transitory readable storage medium, where the non-transitory readable storage medium stores a program or instructions. When the program or the instructions are executed by a processor, various processes of the decoding method embodiment are implemented, and the same technical effect may be achieved. To avoid repetition, details are not described herein again.

The processor is a processor in the decoding device described in the foregoing embodiment. The non-transitory readable storage medium includes a non-transitory computer-readable storage medium, for example, a computer read-only memory ROM, a random access memory RAM, a magnetic disk, or an optical disc.

Figure 13:
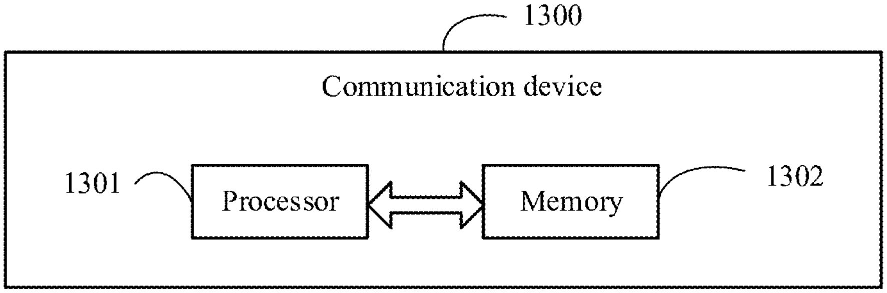
FIG. 13 is a schematic diagram of a structure of a communication device according to an embodiment of this application.

Optionally, as shown in FIG. 13, an embodiment of this application further provides a communication device 1300, including a processor 1301 and a memory 1302, where a program or instructions, executable on the processor 1301, are stored in the memory 1302. For example, when the communication device 1300 is a coding device, when the program or the instructions are executed by the processor 1301, various steps of the coding method embodiment are implemented, and the same technical effect may be achieved. When the communication device 1300 is a decoding device, when the program or the instructions are executed by the processor 1301, various steps of the foregoing decoding method embodiment are implemented, and the same technical effect may be achieved. To avoid repetition, details are not described herein again.

An embodiment of this application further provides a chip. The chip includes a processor and a communication interface. The communication interface is coupled to the processor. The processor is configured to run a program or instructions, to implement the various processes of the coding method or decoding method embodiment, and may achieve the same technical effect. To avoid repetition, details are not described herein again.

It should be understood that, the chip mentioned in this embodiment of this application may be further referred to as a system-level chip, a system chip, a chip system, a system-on-chip, or the like.

An embodiment of this application further provides a computer program product, being stored in a non-transitory storage medium, where the computer program product, when executed by at least one processor, implements the various processes of the coding method or decoding method embodiment, and may achieve the same technical effect. To avoid repetition, details are not described herein again.

An embodiment of this application further provides a communication system, including at least a coding device and a decoding device, where the coding device may be configured to perform the steps of the coding method, and the decoding device may be configured to perform the steps of the decoding method. The same technical effect may be achieved. To avoid repetition, details are not described herein again.

An embodiment of this application further provides a communication device. The communication device is configured to perform the steps of the coding method or the decoding method, and may achieve the same technical effect. To avoid repetition, details are not described herein again.

It should be noted that, the terms "include", "comprise" or any other variants mean to cover the non-exclusive inclusion, so that the processes, methods, objects, or apparatuses which include a series of elements not only include those elements, but also include other elements which are not clearly listed, or include inherent elements of the processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware. Based on such an understanding, the technical solutions of this application essentially, or the part contributing to the related art, may be presented in the form of a computer software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in embodiments of this application.

Although embodiments of this application have been described above with reference to the accompanying drawings, this application is not limited to the implementations described above, and the implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A coding method, comprising:

quantizing, by an encoder, geometric information of a target three-dimensional mesh, to obtain first information, wherein the first information comprises at least one of the following:

first precision geometric information, second precision geometric information, or information about a supplementary point; and encoding, by the encoder, the first information, wherein the first precision geometric information is quantized geometric information of the target three-dimensional mesh, the second precision geometric information is geometric information lost in a quantization process of the target three-dimensional mesh, and the information about the supplementary point is information about a point that is generated in the quantization process and that needs additional processing.

2. The method according to claim 1, wherein the quantizing geometric information of a target three-dimensional mesh, to obtain first information comprises:

quantizing, by the encoder, each vertex in the target three-dimensional mesh according to a quantization parameter of each component, to obtain the first precision geometric information.

3. The method according to claim 2, wherein the quantizing geometric information of a target three-dimensional mesh, to obtain first information further comprises:

obtaining, by the encoder, the second precision geometric information according to the first precision geometric information and the quantization parameter of each component.

4. The method according to claim 2, wherein the quantizing geometric information of a target three-dimensional mesh, to obtain first information further comprises:

determining, by the encoder, the information about the supplementary point according to the geometric information of the target three-dimensional mesh and the first precision geometric information.

5. The method according to claim 1, wherein the information about the supplementary point comprises at least one of the following:

an index of a vertex in first precision geometric information corresponding to the supplementary point;

third precision geometric information of the supplementary point, wherein the third precision geometric information is quantized three-dimensional coordinate information of the supplementary point; or fourth precision geometric information of the supplementary point, wherein the fourth precision geometric information is three-dimensional coordinate information lost in a quantization process of the supplementary point.

6. The method according to claim 1, wherein the encoding the first information comprises:

performing, by the encoder, processing on the first information, to obtain second information, wherein the second information comprises at least one of an occupancy map or a geometric map; and encoding, by the encoder, the second information.

7. The method according to claim 6, wherein in a case that the first information comprises the first precision geometric information, the performing processing on the first information, to obtain second information comprises:

dividing, by the encoder, the first precision geometric information into three-dimensional patches;

performing, by the encoder, two-dimensional projection on the three-dimensional patches, to obtain two-dimensional patches;

packing, by the encoder, the two-dimensional patches, to obtain two-dimensional image information; and obtaining, by the encoder, a first precision occupancy map and a first precision geometric map according to the two-dimensional image information.

8. The method according to claim 7, wherein after the packing the two-dimensional patches, to obtain two-dimensional image information, the method further comprises:

obtaining, by the encoder, patch information according to information in a process of obtaining the two-dimensional image information; and encoding, by the encoder, the patch information, to obtain a patch information sub-bitstream.

9. The method according to claim 6, wherein in a case that the first information comprises the second precision geometric information, the performing processing on the first information, to obtain second information comprises:

obtaining, by the encoder, an arrangement order of vertices comprised in the first precision geometric information; and arranging, by the encoder, second precision geometric information corresponding to the vertices comprised in the first precision geometric information in a two-dimensional image, to generate a second precision geometric map;

or, in a case that the first information comprises the information about the supplementary point, the performing processing on the first information, to obtain second information comprises:

arranging, by the encoder, third precision geometric information of the supplementary point into a first raw patch;

arranging, by the encoder, fourth precision geometric information of the supplementary point into a second raw patch in a same arrangement order as the first raw patch; and compressing, by the encoder, the first raw patch and the second raw patch, to obtain a geometric map of the supplementary point.

10. The method according to claim 6, wherein the encoding, by the encoder, the second information comprises:

encoding, by the encoder, a first precision geometric map and a second precision geometric map, to obtain a geometric map sub-bitstream.

11. A coding device, comprising a processor and a memory, wherein a program or instructions are stored in the memory and executable on the processor, and when the program or the instructions are executed by the processor, steps of the coding method according to claim 1 are implemented.

12. A decoding method, comprising:

decoding, by a decoder, an obtained bitstream, to obtain first information, wherein the first information comprises at least one of the following: first precision geometric information, second precision geometric information, or information about a supplementary point; and performing, by the decoder, dequantization according to the first information, to obtain a target three-dimensional mesh, wherein the first precision geometric information is quantized geometric information of the target three-dimensional mesh, the second precision geometric information is geometric information lost in a quantization process of the target three-dimensional mesh, and the information about the supplementary point is information about a point that is generated in the quantization process and that needs additional processing.

13. The method according to claim 12, wherein the decoding an obtained bitstream, to obtain first information comprises:

obtaining, by the decoder, a target sub-bitstream according to the obtained bitstream, wherein the target sub-bitstream comprises: a patch information sub-bitstream, an occupancy map sub-bitstream, and a geometric map sub-bitstream;

obtaining, by the decoder, second information according to the target sub-bitstream, wherein the second information comprises: at least one of an occupancy map or a geometric map; and obtaining, by the decoder, the first information according to the second information.

14. The method according to claim 13, wherein in a case that the first information comprises the first precision geometric information, the obtaining the first information according to the second information comprises:

obtaining, by the decoder, two-dimensional image information according to a first precision occupancy map and a first precision geometric map;

obtaining, by the decoder, a two-dimensional patch according to the two-dimensional image information;

performing, by the decoder, three-dimensional back-projection on the two-dimensional patch according to patch information corresponding to the patch information sub-bitstream, to obtain a three-dimensional patch; and obtaining, by the decoder, the first precision geometric information according to the three-dimensional patch;

or, in a case that the first information comprises the second precision geometric information, the obtaining the first information according to the second information comprises:

obtaining, by the decoder, the second precision geometric information according to a second precision geometric map;

or, in a case that the first information comprises the information about the supplementary point, the obtaining the first information according to the second information comprises:

determining, by the decoder according to a geometric map of the supplementary point, a first raw patch corresponding to third precision geometric information of the supplementary point and a second raw patch corresponding to fourth precision geometric information of the supplementary point; and determining, by the decoder, the information about the supplementary point according to the first raw patch and the second raw patch.

15. The method according to claim 12, wherein the performing dequantization according to the first information, to obtain a target three-dimensional mesh comprises:

determining, by the decoder, coordinates of each vertex in the first precision geometric information according to the first precision geometric information and a quantization parameter of each component.

16. The method according to claim 15, wherein the performing dequantization according to the first information, to obtain a target three-dimensional mesh further comprises:

determining, by the decoder, the target three-dimensional mesh according to coordinates of each vertex in the target three-dimensional mesh and the second precision geometric information.

17. The method according to claim 15, wherein the performing dequantization according to the first information, to obtain a target three-dimensional mesh further comprises:

determining, by the decoder, the target three-dimensional mesh according to the information about the supplementary point and the coordinates of each vertex in the first precision geometric information.

18. The method according to claim 15, wherein the information about the supplementary point comprises at least one of the following:

an index of a vertex in first precision geometric information corresponding to the supplementary point;

third precision geometric information of the supplementary point, wherein the third precision geometric information is quantized three-dimensional coordinate information of the supplementary point; or fourth precision geometric information of the supplementary point, wherein the fourth precision geometric information is three-dimensional coordinate information lost in a quantization process of the supplementary point.

19. A decoding device, comprising a processor and a memory, wherein a program or instructions are stored in the memory and executable on the processor, and the program or the instructions, when executed by the processor, cause the decoding device to perform:

decoding an obtained bitstream, to obtain first information, wherein the first information comprises at least one of the following: first precision geometric information, second precision geometric information, or information about a supplementary point; and performing dequantization according to the first information, to obtain a target three-dimensional mesh, wherein the first precision geometric information is quantized geometric information of the target three-dimensional mesh, the second precision geometric information is geometric information lost in a quantization process of the target three-dimensional mesh, and the information about the supplementary point is information about a point that is generated in the quantization process and that needs additional processing.

20. The decoding device according to claim 19, wherein the program or the instructions, when executed by the processor, cause the decoding device to perform:

obtaining a target sub-bitstream according to the obtained bitstream, wherein the target sub-bitstream comprises: a patch information sub-bitstream, an occupancy map sub-bitstream, and a geometric map sub-bitstream;

obtaining second information according to the target sub-bitstream, wherein the second information comprises: at least one of an occupancy map or a geometric map; and obtaining the first information according to the second information.

* * * * *